US008059695B2

(12) United States Patent
Manzi (10) Patent No.: US 8,059,695 B2
(45) Date of Patent: Nov. 15, 2011

(54) SPREAD CARRIER SELF CORRECTING CODES

(75) Inventor: David G. Manzi, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 887 days.

(21) Appl. No.: 11/891,948

(22) Filed: Aug. 13, 2007

(65) Prior Publication Data

US 2009/0046764 A1 Feb. 19, 2009

(51) Int. Cl.
*H04B 1/00* (2006.01)

(52) U.S. Cl. .................................................. 375/141

(58) Field of Classification Search .......... 375/130, 375/135, 136, 137, 139, 142, 146, 147, 149, 375/150, 152, 143, 343; 704/216, 218, 237, 704/263; 708/5, 422, 813; 342/108, 145, 342/189, 378

See application file for complete search history.

(56) References Cited

U.S. PATENT DOCUMENTS

| 6,959,030 | B1 * | 10/2005 | Clark ........................... 375/130 |
| 2003/0161383 | A1 * | 8/2003 | Mower et al. ................. 375/130 |
| 2004/0042535 | A1 * | 3/2004 | Mayor et al. .................. 375/150 |
| 2004/0180698 | A1 * | 9/2004 | Kamemura et al. ........ 455/562.1 |

OTHER PUBLICATIONS

D.L. Schilling, R.L. Pickholtz & L.B. Milstein, Spread Spectrum Goes Commercial, IEEE Spectrum, Aug. 1990.

* cited by examiner

*Primary Examiner* — Sam K Ahn
(74) *Attorney, Agent, or Firm* — Schwegman, Lundberg & Woessner, P.A.; Gregory J. Gorrie (57) ABSTRACT

A transmitter, receiver and communication technique. The transmitter is adapted to interleave a first pseudo-noise sequence with a second pseudo-noise sequence to provide a third pseudo-noise sequence. The third sequence is transmitted and then received by the inventive receiver. The first and second sequences are chosen so that an XOR of the two sequences produces a third, known-valid pseudo-noise sequence. The receiver includes an arrangement for receiving and correlating the third pseudo-noise sequence to provide a measure of a frequency of the transmitted signal. The receiver further includes an arrangement for downconverting and filtering the received signal to provide a filtered complex signal. A complex multiplier is included for effecting a complex multiplication of the filtered complex signal with a delayed version of the filtered complex signal to provide a product. A correlator is included for correlating the product to provide the measure of frequency.

17 Claims, 8 Drawing Sheets

SPREAD CARRIER SELF CORRECTING CODES

BACKGROUND OF THE INVENTION

1. Field of the Invention

The present invention relates to communication systems. More specifically, the present invention relates to phase shift keyed communication systems.

2. Description of the Related Art

Spread spectrum is a technique for secure digital communications that is now being exploited for commercial and industrial applications. Spread-spectrum radio communications has long been a favorite technology of the military because of its resistance to jamming and the fact that it is hard for an enemy to intercept. The reason: spread-spectrum signals, which are distributed over a wide range of frequencies and then collected onto their original frequency at the receiver, are relatively inconspicuous. As they are unlikely to be intercepted by a military opponent, these signals are also unlikely to interfere with other signals intended for business and consumer users—including those transmitted on the same frequencies. This opens up a crowded frequency spectra for expanded use. See "Spread Spectrum Goes Commercial", published in *IEEE Spectrum* by D. L. Schilling, R. L. Pickholtz and L. B. Milstein (August, 1990). Applications for spread spectrum range from "wireless" LAN's, to integrated bar code scanner/palmtop computer/radio modem devices for warehousing, to digital dispatch, to digital cellular telephone communications, to "information society" city/area/state or country wide networks for passing faxes, computer data, email, or multimedia data. (See http://www.sss-mag.com/ss.html#tutorial.)

Spread-spectrum techniques are methods in which energy generated at a single frequency is deliberately spread over a wide band of frequencies. This approach is used for a variety of reasons, including increasing resistance to natural interference or jamming and to prevent hostile detection. This is a technique in which a signaling (telecommunication) signal is transmitted on a bandwidth considerably larger than the frequency content of the original information.

Spread-spectrum telecommunication is a signal structuring technique that employs direct sequence, frequency hopping or a hybrid of these, which can be used for multiple access and/or multiple functions. This technique decreases the potential interference to other receivers while achieving privacy. Spread spectrum generally makes use of a sequential noise-like signal structure, called a Pseudo-Noise (PN) sequence, to spread the normally narrowband information signal over a relatively wideband (radio) band of frequencies. The receiver correlates the received signals to retrieve the original information signalling (telecommunication) signal. (See Wikipedia at http://en.wikipedia.org/wiki/Spread_spectrum as of Oct. 8, 2006.)

Phase Shift Keyed (PSK) waveforms are the basis of Direct Sequence Spread Spectrum (DSSS) systems used in a variety of wireless communications systems worldwide (Cellular, WiFi, etc.) Phase-shift keying (PSK) is a digital modulation scheme that conveys data by changing, or modulating, the phase of a reference signal (the carrier wave). (See Wikipedia at http://en.wikipedia.org/wiki/Phase-shift_keying as of Oct. 8, 2006.) DSSS represents a symbol by using a Pseudo-Noise sequence as described above. Specifically in a DSSS system the PN sequence is created through the use of many short bits of information called chips to avoid confusion with the bits of the message itself. DSSS transmissions are ideally preceded by a uniquely spread preamble. This preamble should be longer, in duration, than a bit to ensure a higher probability of detection. The downside of this is that a greater degree of frequency alignment between transmitter and receiver must be achieved in order to detect this longer preamble.

Significant frequency error must be handled by the preamble detection methods employed in a receiver. Significant frequency error is defined in this document as an error of $+/-1/(4T)$ where T is the preamble period. This value results from the assumption of the use of Binary Phase Shift Keying (BPSK). Higher order PSK systems will typically be even more sensitive to frequency errors using existing techniques. For simplicity the BPSK based assumption is used, but its use should not be taken as an indication that SCSDC are only applicable to BPSK systems. SCSDC are generally applicable to PSK systems regardless of their order. Common methods to provide for adequate preamble detection in the presence of significant frequency error include the following approaches. The first and simplest involves a construction of a preamble from many shorter symbols. Shorter symbols are less susceptible to frequency errors, but also contain less energy and so are more likely to be missed or decoded improperly. The use of a preamble composed of many shorter symbols would help to partially counteract this problem. The probability of missing any one symbol is high, but the probability of missing all the symbols is low. The preamble must then be long enough so that at least one symbol is guaranteed to be detected at a rate in agreement with the system requirements. These smaller preamble symbols are detected and decoded individually with the overall pattern resulting from this symbol-by-symbol decoding being used to identify an incoming message.

Unfortunately, this approach can yield long preambles, which will result in an overhead hit on total channel throughput. In addition the reliance on short preamble symbols does not take advantage of the overall preamble length to optimize the Code Division Multiple Access (CDMA) aspects of DSSS systems.

A second method is to use a separate modulation scheme for the preamble that is not susceptible to frequency errors. Often these modulations schemes are implemented via a Frequency Shift Keying (FSK) such as Minimum Shift Keying (MSK) or Gaussian Minimum Shift Keying (GSMK). While these schemes are less susceptible to frequency error, they are not as well suited to Code Division Multiple Access (CDMA) implementations. These schemes also complicate the receiver by requiring another method of signal detection/demodulation to be implemented along with the detection/demodulation circuitry required for processing the data portion of the signal.

The third method is the most straightforward. In this case a long preamble symbol is used and correlated for directly. The shortcoming here is the aforementioned increase in sensitivity to frequency error as the preamble symbol gets longer in duration.

Hence, a need exists in the art for a simple and easy to implement system or method for defining a preamble for a direct sequence spread spectrum system that preserves the direct sequence capability while providing increased tolerance for frequency error.

SUMMARY OF THE INVENTION

The need in the art is addressed by the transmitter, receiver and communication technique of the present invention. The transmitter is adapted to interleave a first pseudo-noise sequence with a second pseudo-noise sequence to provide a third pseudo-noise sequence. The third sequence is transmitted and then received by the inventive receiver.

In the best mode, the first and second sequences are chosen so that the XOR of the two sequences, and the XOR of the two sequences with an offset of one chip period between them produce a combined third, known-good PN sequence. In the illustrative embodiment, the inventive receiver includes an arrangement for receiving and correlating the third pseudo-noise sequence to provide a measure of a frequency of the transmitted signal. In more specific embodiments, the receiver further includes an arrangement for down converting and filtering the received signal to provide a filtered complex signal. A complex multiplier is included for effecting a complex multiplication of the filtered complex signal with a delayed version of the filtered complex signal to provide a product. In the illustrative embodiment, the delayed version of the filtered signal is delayed by a chip period. A correlator is included for correlating the product to provide the measure of frequency. Finally, a peak detector may be included as is common in the art.

In the best mode, the first sequence or the second sequence is considered a reference signal. The reference signal is embedded within the information-bearing signal to aid the receiver in detection with both sequences comprising the preamble used in detecting the incoming signal.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
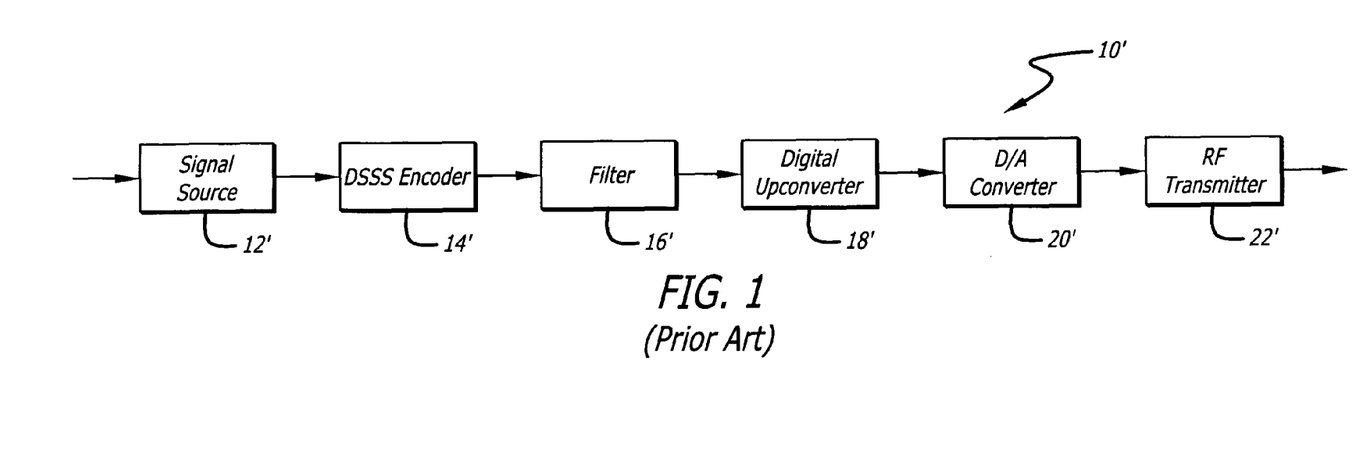
FIG. 1 is a high-level block diagram of conventional DSSS transmitter.

FIG. 1 is a high level block diagram of conventional DSSS transmitter. The conventional DSSS transmitter 10' includes a signal source 12', a DSSS encoder 14', a filter 16', a digital upconverter 18', a digital to analog converter 20' and an RF transmitter 22'. As mentioned above, this system is subject to error in preamble detection in the presence of significant frequency error (defined here, based on the BPSK assumption, as a frequency error greater than or equal to +/−1/(4T), where T is the preamble symbol period).

The present invention circumvents the requirement for frequency accuracy and it can be applied to any DSSS waveform, preamble or not, in order to relax frequency alignment requirements between transmitter and receiver. The present invention endeavors to address the problem of preamble (or long sequence) detection by providing a signal that is able to assist in its own detection.

In essence, in accordance with the invention, a reference signal is embedded within an information bearing signal that aids the receiver in the act of detection. This is analogous to transmitting a carrier along with the information bearing portion of the signal.

In conventional systems where the carrier is transmitted, the carrier provides a reference for the receiver so that it does not have to search in frequency. Transmission of the carrier, however, destroys the DSSS and CDMA capabilities of a system. Since the carrier is a narrow band signal, it is easily detected or jammed and also very susceptible to multipath. It also prevents two separate signals with individual spreading codes from operating at the same time (or near the same frequency) since, although the information signal is DSSS and thus CDMA is possible, the carriers are not, and therefore the two transmissions will interfere with one another.

Instead of sending a carrier, the present invention proposes the transmission of a reference signal. This reference signal is essentially a spread carrier, however, it is transmitted along with the information-bearing signal. Specifically, the transmitter generates two Pseudo-Noise (PN) sequences that are interleaved with one another prior to transmission. These two sequences are chosen so that the XOR of the two sequences produces a third, known-good PN sequence. The interleaved signal is itself a PN sequence. This is depicted in FIGS. 2 and 3.

Figure 2:
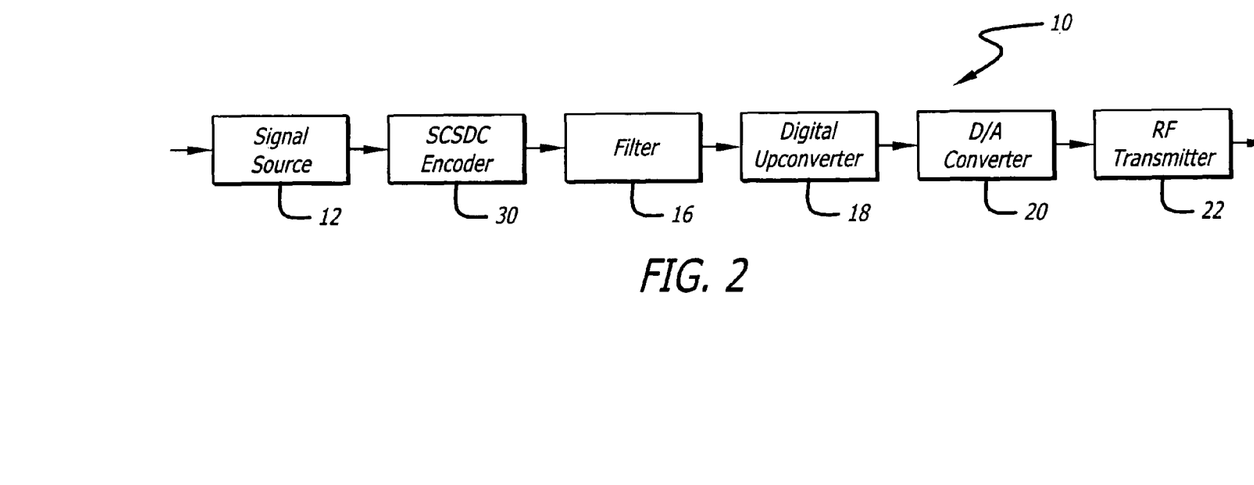
FIG. 2 is a high-level block diagram of a DSSS transmitter implemented in accordance with an illustrative embodiment of the present teachings.

FIG. 2 is a high-level block diagram of a DSSS transmitter implemented in accordance with an illustrative embodiment of the present teachings. As shown in FIG. 2, the transmitter 10 includes a signal source 12, a filter 16, a digital upconverter 18, a digital to analog converter 20 and an RF transmitter 22 as per the transmitter 10' of FIG. 1. However, in accordance with the invention, a spread carrier self-detecting code (SCSDC) encoder 30 of novel design is added between the signal source 12 and the filter 16. The operation of the SCSDC encoder is as follows. In place of a typical DSSS PN sequence, an SCSDC sequence is introduced as a preamble. This sequence is comprised of two interleaved codes (C and K codes), but is otherwise indistinguishable, from a transmission standpoint, from a normal DSSS PN sequence. The interleaving of the two codes (C and K) can be achieved in advance, with the combined code being stored just as a typical DSSS code would be stored. Application of this code to the signal is carried out in the same manner as in a DSSS system. The major difference between DSSS and SCSDC systems comes in the receiver structure.

Figure 3:
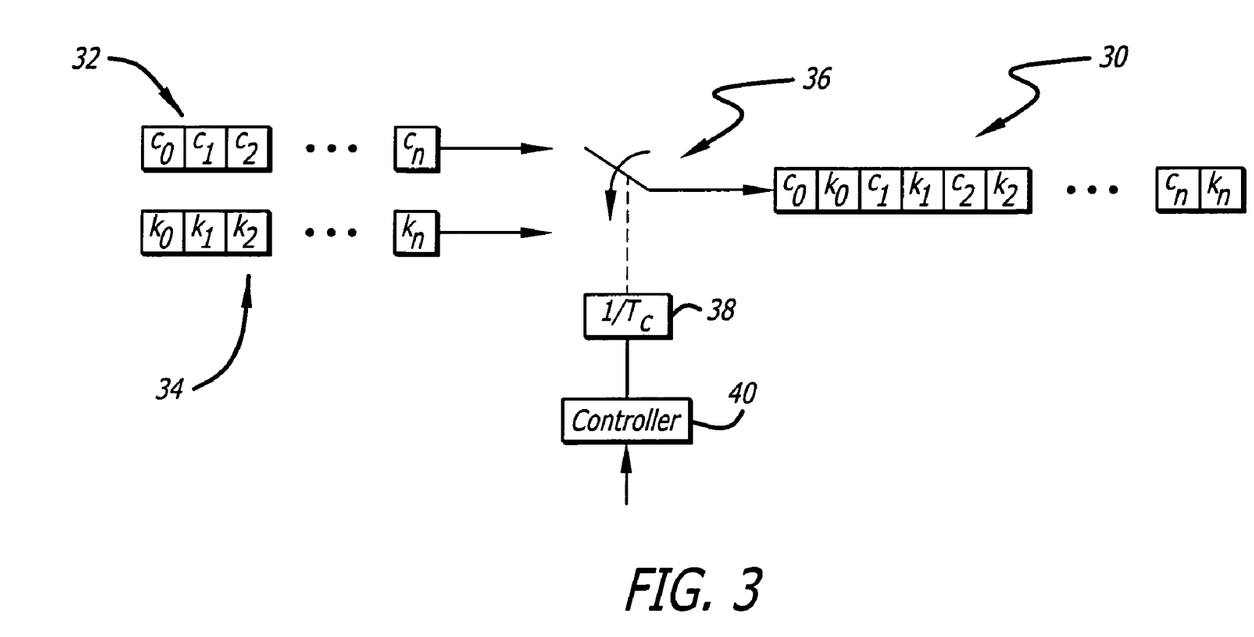
FIG. 3 is a diagram showing an illustrative embodiment of the SCSDC encoder of the present invention in more detail.

FIG. 3 is a diagram showing an illustrative embodiment of the SCSDC encoder of the present invention in more detail.

Figure 4:
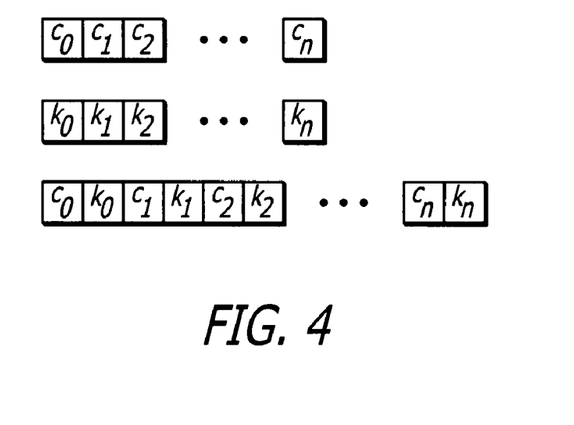
FIG. 4 is a diagram illustrating the operation of the SCSDC encoder of FIG. 3.

FIG. 4 is a diagram illustrating the operation of the SCSDC encoder 30 of FIG. 3. As shown in FIGS. 3 and 4, in accordance with the invention, each user has two codes that are interleaved prior to transmission and then transmitted. That is, two sequences $c_0, c_1, c_2 \ldots C_n$ and $k_0, k_1, k_2, \ldots k_n$ are interleaved to provide a third sequence $c_0k_0, c_1k_1, c_2k_2, \ldots c_nk_n$.

As shown in the simplified diagram of FIG. 3, the encoder 30 includes a first source 32 of a first sequence $c_0, c_1, c_2, \ldots c_n$, a second source 34 of a second sequence $k_0, k_1, k_2, \ldots k_n$, and a switch 36 for interleaving the two sequences. The first and second sources may be implemented with shift registers and the switch 36 may be implemented with a multiplexer. The switch 36 selects the C code or the K code chips and, in accordance with the present teachings, toggles at the chip rate ($1/T_c$, where $T_c$ is the chip period) in response to a signal from a clock 38. The clock 38 operates under the control of a controller 40. In the present invention the SCSDC is utilized only for preamble encoding. In this capacity, the signal source 12 in FIG. 2 is the data that is appended to the SCSDC preamble in the SCSDC encoder.

In the best mode, the c and k sequences have good auto and cross-correlation. In addition, there will be a good cross-correlation between any two users sets of codes to maintain the CDMA capabilities of the system. In this context, 'good' is determined by the number of intended simultaneous users of the channel, their relative distances, and any anti-jam or low probability of intercept/low probability of detect requirements levied upon the system. Because of this, 'good' is a determination of the designer.

The interleaved sequences can be random, pseudo-random or deterministic. Obviously, if the c and k sequences are random, the interleaved sequence is random as well. In the illustrative implementation, one of the sequences is a spread carrier sequence. That is, the carrier frequency is spread and represented as a random or pseudo-random sequence. Hence, the k code or sequence acts as a spread spectrum carrier for the c code and vice versa.

Figure 5:
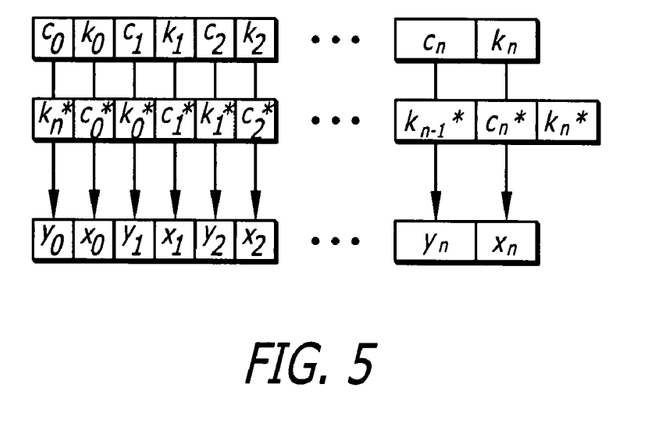
FIG. 5 is diagram illustrating a decoding operation for the interleaved sequence in accordance with an illustrative embodiment of the present teachings.

FIG. 5 is diagram illustrating a decoding operation for the interleaved sequence in accordance with an illustrative embodiment of the present teachings. As shown in FIG. 5, in the receiver/decoder, the incoming interleaved sequence $c_0, k_0, c_1, k_1, c_2, k_2, \ldots c_n, k_n$ is received, extracted and multiplied with a delayed phase conjugate version of itself $k_n^*, c_0^*, k_0^*, c_1^*, k_1^*, c_2^*, k_2^*, \ldots c_n^*$. This yields a self-referential mix down of the code by which, as mentioned above, the k code or sequence acts as a spread spectrum carrier for the c code and vice versa. The result of this operation is two new, interleaved codes (X and Y) which when taken together form a PN sequence which the SCSDC decoder will look for.

While the invention is illustrated with respect to bits, those skilled in the art will appreciated that each phase may be a complex phase without departing from the scope of the present teachings.

Figure 6:
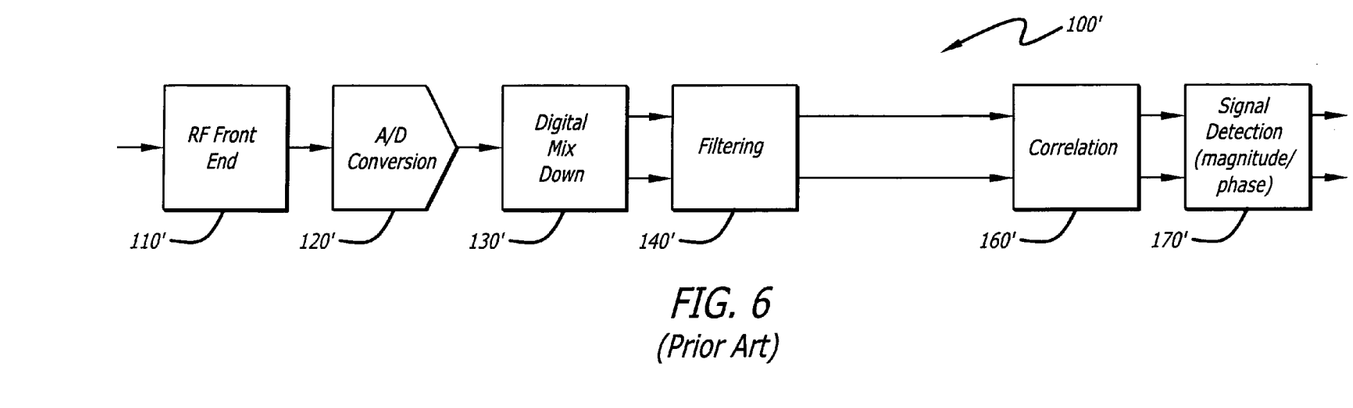
FIG. 6 is a simplified block diagram of a direct sequence spread spectrum receiver in accordance with conventional teachings.

FIG. 6 is a simplified block diagram of a direct sequence spread spectrum receiver in accordance with conventional teachings. The receiver 100' is a typical Phase Shift Keyed (PSK) system having an RF front-end detector 110', an analog-to-digital converter 120', a digital mixer/down-converter 130', a low pass/matched filter 140', a correlator 160', and a circuit 170' for detecting the magnitude and phase of the detected signal.

Figure 7:
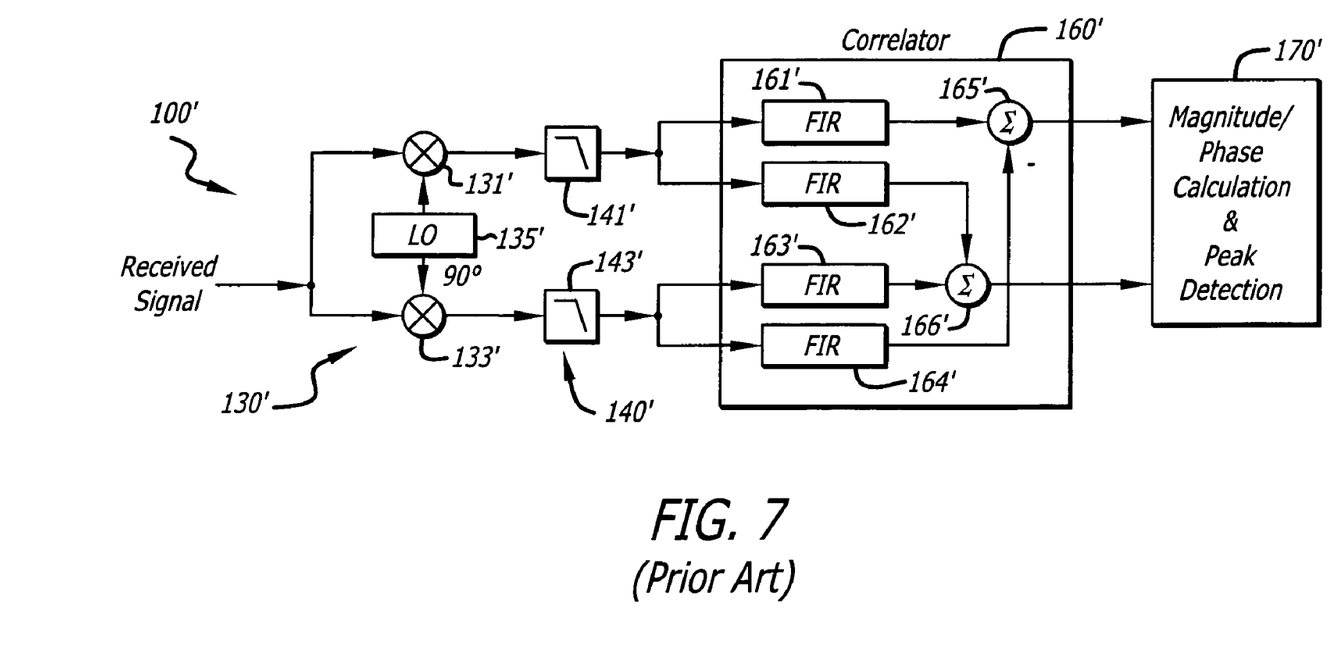
FIG. 7 is a diagram showing the mixer, filter and correlator of the receiver of FIG. 6 in more detail.

FIG. 7 is a diagram showing the mixer, filter and correlator of the receiver of FIG. 6 in more detail. As shown in FIG. 7, the mixer 130' includes in-phase and quadrature mixers 131' and 133' with a local oscillator 135' coupled thereto. The inphase output of the first mixer 131' is provided to a first low pass/matched filter 141' and the quadrature output of the second mixer 133' is input to a second low pass/matched filter 143 in the filter block 140' of FIG. 6. Returning to FIG. 7, conventionally, the outputs of the filters 141' and 143' are input to first and second and third and fourth finite impulse response (FIR) filters 161', 162', 163', and 164' respectively. The outputs of the first and fourth FIR filters 161' and 164' are input to a first summer 165' with the output of the fourth FIR filter being inverted, and the outputs of the second and third FIR filters 162' and 163' are input to a second summer 166'. The output of the first and second summers 165' and 166' are input to a signal processor for magnitude and phase calculation and peak detection in a conventional manner.

Figure 8:
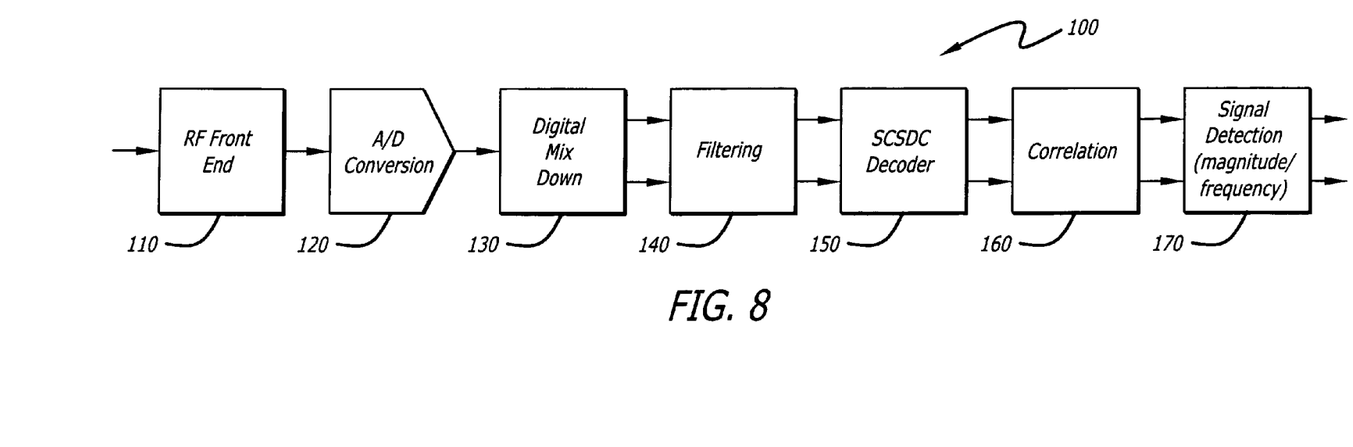
FIG. 8 is a simplified block diagram of a direct sequence spread spectrum receiver in accordance with an illustrative embodiment of the present teachings.

FIG. 8 is a simplified block diagram of a direct sequence spread spectrum receiver in accordance with an illustrative embodiment of the present teachings. As is evident from FIGS. 6 and 7, the inventive receiver 100 is similar to the conventional PSK receiver 100' with an RF front end detector 110, an analog-to-digital converter 120, a mixer 130, a filter 140 and a correlator 160.

However, in accordance with the present teachings, between the filter 140 and the correlator 160, one additional element, an SCSDC decoder 150 is added. At this point the signal is split. One path is unaltered, the other is delayed by the chip period (a chip is one bit of the PN sequence) and conjugated (the quadrature portion of the signal is inverted). These two signal paths are then multiplied using a complex multiplication. The result of this operation is that, half of the time (every other chip period), the signal output by the complex multiplier 180 is the X code, the rest of the time the output of the complex multiplier 180 is the Y code. These two codes when interleaved (as they are in the output of the complex multiplier 180) comprise a third PN sequence. The final correlator 160 then identifies this third sequence. The result of this correlation is a pronounced correlation peak that is easily detectable over a much broader frequency error range.

Figure 9:
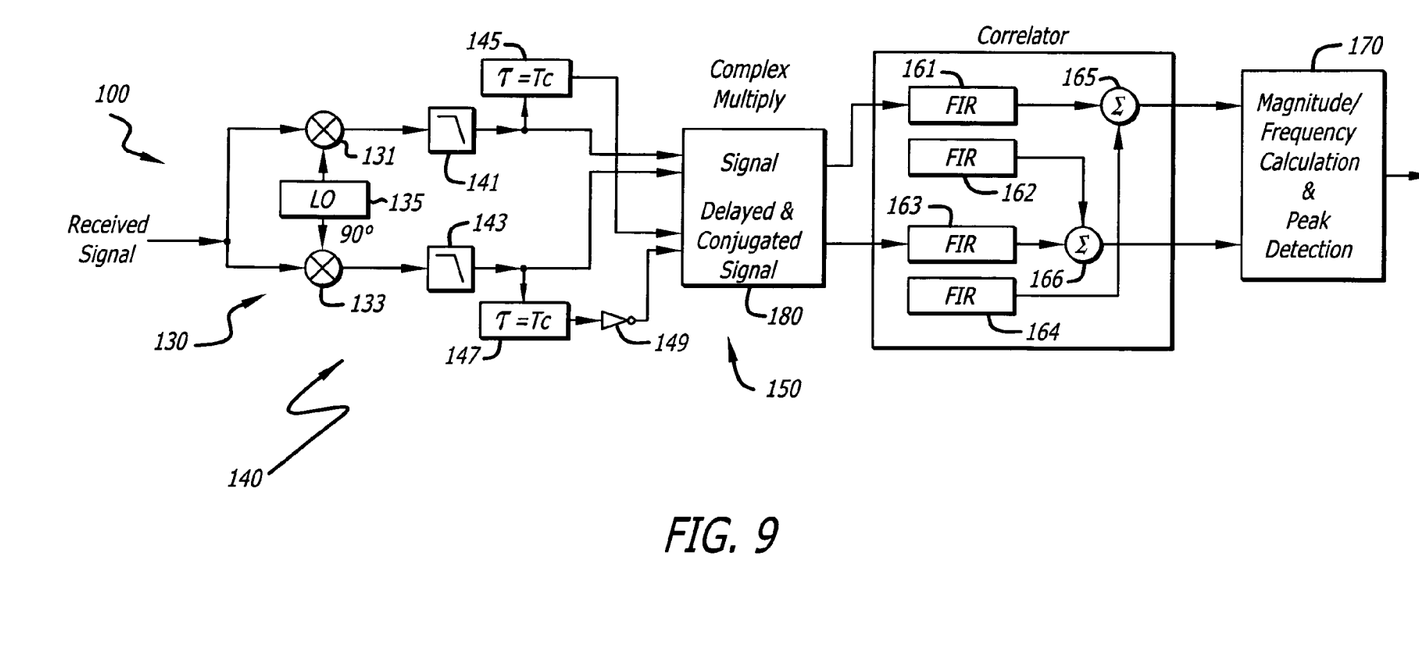
FIG. 9 is a diagram showing the mixer, filter and correlator of the receiver of FIG. 8 in more detail.

FIG. 9 is a diagram showing the mixer, filter and correlator of the receiver of FIG. 8 in more detail. As shown in FIG. 9, the mixer 130 includes in-phase and quadrature mixers 131 and 133 with a local oscillator 135 coupled thereto. The inphase output of the first mixer 131 is provided to a first low pass filter 141 and the quadrature output of the second mixer 133 is input to a second low pass filter 143 in the filter block 140 of FIG. 8.

Returning to FIG. 9, in accordance with the present teachings, the outputs of the filters 141 and 143 are input to first and second delay elements 145 and 147 respectively and a complex multiply circuit 180. Each delay element 145 and 147 delays the signal or sequence by one chip. Hence, delay τ is equal to the chip period '$T_c$'. The output of the second delay element 147 is inverted (149). The delayed and inverted sequence is the delayed phase conjugate sequence $k_n^*, c_0^*, k_0^*, c_1^*, k_1^*, c_2^*, k_2^*, \ldots c_n^*$ shown in FIG. 5.

The delayed and inverted signals are input to the complex multiply circuit 180 which outputs the sequence $y_0, x_0, y_1, x_1, y_2, x_2, \ldots y_n, x_n$ depicted in FIG. 5.

Figure 10:
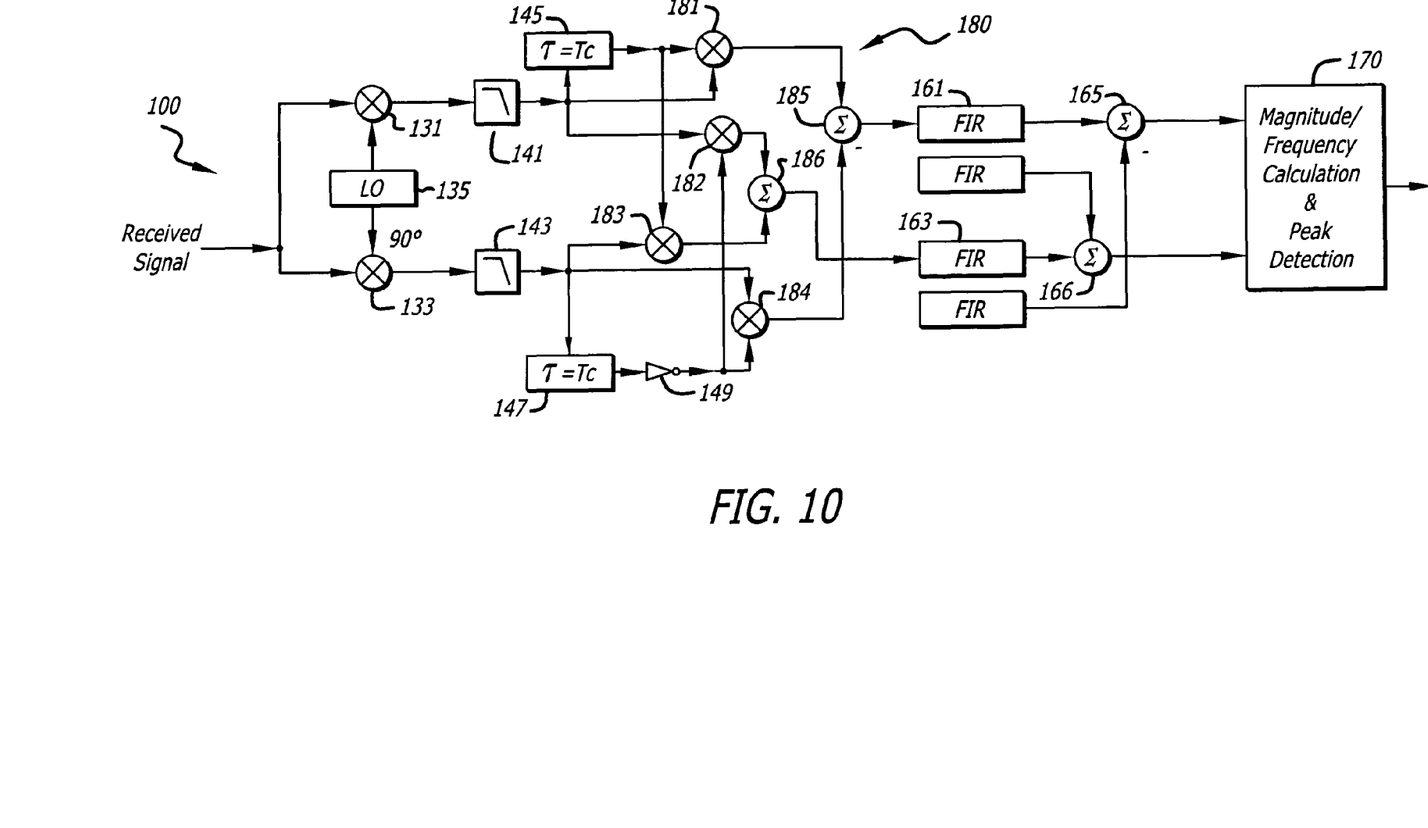
FIG. 10 is a diagram the mixer, filter, complex multiplier and correlator of the receiver of FIG. 9 in more detail.

FIG. 10 is a diagram the mixer, filter, complex multiplier and correlator of the receiver of FIG. 9 in more detail.

Figure 11:
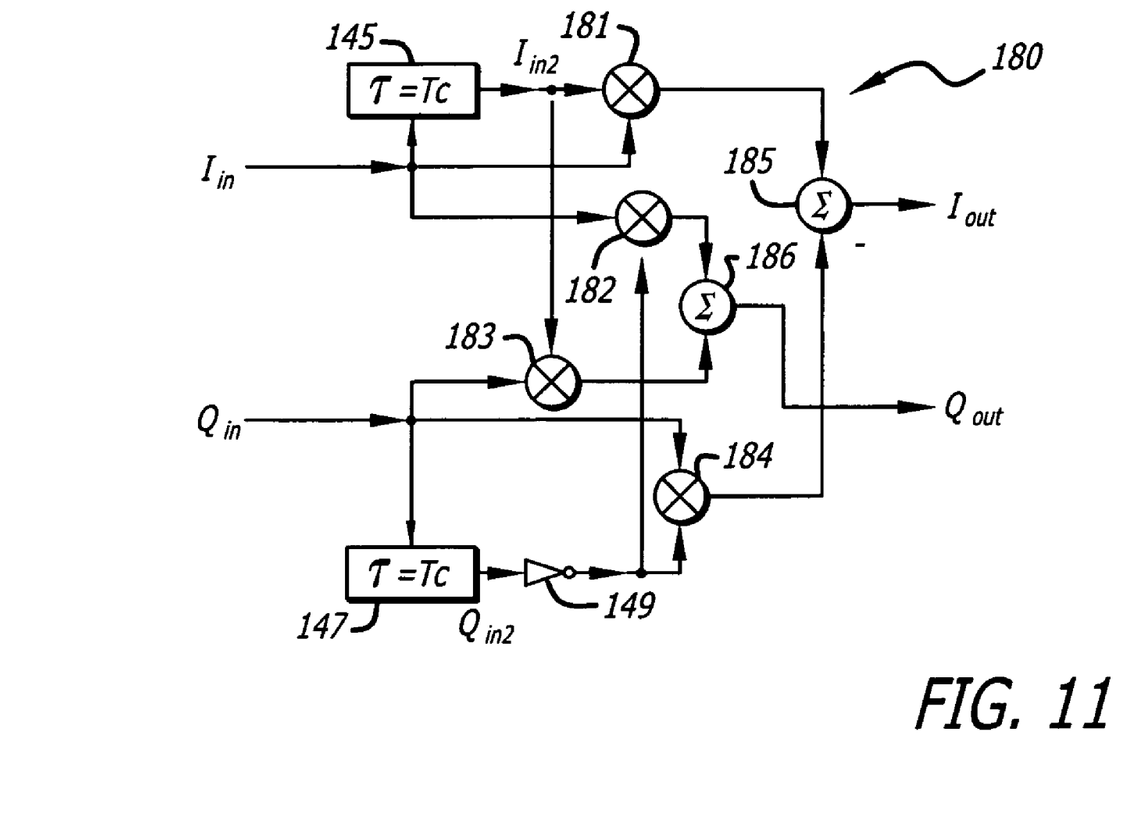
FIG. 11 is a diagram of an illustrative implementation of the complex multiplier of FIG. 10.

FIG. 11 is a diagram of an illustrative implementation of the complex multiplier of FIG. 10. As shown in FIGS. 10 and 11, in the illustrative embodiment, the complex multiplier 180 is implemented with first, second, third and fourth multipliers 181-184 and first and second summers 185 and 186. The first multiplier 181 multiplies the outputs from the first low pass filter 141 and the first delay element 145 and sends the product to the first summer where it is added to the negative of the product of the outputs of the second low pass filter 143 and the second delay element 147 via the inverter 149 effectively subtracting the output of multiplier 184 from the output of multiplier 181. The inverter 149 supplies the conjugate of the delayed signal output by the second low pass filter 143. The output of the first summer is then input to the first finite impulse response filter 161.

The second multiplier 182 multiplies the outputs of the first low pass filter 141 and the output of the inverter 149 and feeds the product to the second summer 186 where it is added to the product of the output of the first delay element 145 and the second low pass filter 143. The output of the second summer is fed to the second FIR 163.

As illustrated in FIG. 11, $I_{in}$ and $Q_{in}$ are the in phase and quadrature (respectively) outputs of the digital filtering block. $I_{out}$ and $Q_{out}$ are the in phase and quadrature (respectively) outputs of the SCSDC decoder 150 (FIG. 8). $I_{in2}$ and $Q_{in2}$ are the delayed version of $I_{in}$ and $Q_{in}$ where the delay is equal to the chip period ($T_c$). The overall operation is a complex multiplication of the form $(a+b_j)(c+d_j)$:

Hence, the complex multiplier 180 receives the interleaved signal and the delayed conjugated signal performs the following operations:

$$I_{out} = (I_{in})(I_{in2}) - (Q_{in})(Q_{in2}) \qquad [1]$$

and $$Q_{out} = (I_{in})(Q_{n2}) + (Q_{in})(I_{in2}) \qquad [2]$$

where: $I_{out}$ is the resulting real component and $Q_{out}$ is the resulting imaginary component.

The output of the complex multiplier circuit, i.e., the sequence $y_0, x_0, y_1, x_1, y_2, x_2, \ldots y_n, x_n$, is then coupled to first and second finite impulse response (FIR) filters 161 and 163 respectively (see FIG. 10). For every SCSDC received, a frequency estimate is obtained in accordance with the present teachings. Accordingly, the unused FIR filters 162 and 164 (FIG. 9) are (and hence the full correlator structure is) preserved to allow for switching between the inventive spread carrier self-detecting codes (SCSDC) mode of operation and conventional direct sequence spread spectrum (DSSS) mode of operation by simply turning off the delay paths and complex multipliers to return to the conventional mode of operation.

As illustrated in FIG. 9, the outputs of the first and second FIR filters 161 and 163 are input to a signal processor 170 for magnitude and frequency calculation and peak detection in accordance with the present teachings. With a complex input, the processor 170 computes a magnitude and associated phase per the processor 170' of FIG. 6. However, the SCSDC operation has the effect of changing the meaning of the phase value. The phase of the I/Q output of the correlator now directly relates to frequency error, but it is still calculated via standard phase calculations. That is, the processor 170 executes essentially the same operations as the processor 170' of FIG. 6 with the exception that in the process of the conventional Cartesian to polar conversion, the processor 170 of the present invention outputs a measure of frequency inasmuch as the operation is differential in nature by virtue of the comparison of the signal to a delayed and conjugated version of same.

Hence, the processor 170 outputs magnitude and frequency. The output of the processor 170 is fed to a peak detector that in turn feeds a timing circuit and a decoder (not shown) as is common in the art In any case, inasmuch as the output of the correlator in an SCSDC receiver is complex, any standard magnitude/phase calculator can be used in the detector 170. Typical implementations use a COordinate Rotation DIgital Computer (CORDIC) process which calculates magnitude and phase. If magnitude is all that is required, often a magnitude$^2$ computation is more easily implemented ($I_{out}^2 + Q_{out}^2$).

Furthermore the angle of the correlation peak (it is a complex number) is directly correlated with the frequency error between the LO and the incoming signal unambiguously within a range of +/− one half of the chip rate. An angle of 180 degrees corresponds to an error of one half of the chip rate. +90 degrees would be an error of one quarter the chip rate, −90 degrees would be an error of one quarter the chip rate in the other direction.

Since a frequency error does not affect the magnitude of the correlation peak and detectability is only affected by the noise bandwidth allowed into the receiver, this method provides for a very robust detection method that is relatively insensitive to noise. Inasmuch as the signal acts as its own reference, any frequency error can be handled (wider bandwidths of signal processing will pass more noise however). In most systems the degree of frequency error is much lower than the spread bandwidth (2 times the chip rate or $2T_c$ for a BPSK signal) and so a normal LPF can be used.

In these cases the signal will always be within the LPF filter and so within the limits of un-ambiguity and therefore this system also provides a valuable means for frequency estimation. Since the degree of frequency accuracy required by a typical PSK system is increased as the preamble/code is extended in time, for most systems there is a practical limit to how long a preamble can be made while still being useful. Often this limit is hit before the preamble can attain a length with enough $E_s/N_o$ to provide adequate probability detection.

In the system disclosed herein, there is no increase in required accuracy as the preamble/code is increased in duration and so the desired signal to noise ration (Es/No) (and thus any desired probability of detection) is attainable. Additionally, since each chip of the PN code is referenced by the chip immediately adjacent to it, very large frequency drifts (linear or not) can be tolerated by the system.

The invention should be relatively easy to realize in hardware inasmuch as the delay elements can be implemented with memory locations and the complex multiplication may be implemented with four multipliers and adders in the illustrative embodiment.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A transmitter comprising:
    an encoder to interleave a first pseudo-noise (PN) sequence with a second pseudo-noise sequence to provide a third pseudo-noise sequence, the first and second sequences being chosen so that an exclusive-or (XOR) of the two sequences and an XOR of the two sequences with an offset of one chip period between them produce the third pseudo-noise sequence, the third pseudo-noise sequence being a known good PN sequence, and
    RF transmitter circuitry configured to transmit the third pseudo-noise sequence.

2. The transmitter of claim 1 wherein the encoder includes a first source of a first sequence, a second source of a second sequence and a switch coupled thereto.

3. The transmitter of claim 1 wherein the first or the second pseudo-noise sequence is a reference signal.

4. A receiver comprising:
a decoder configured to receive a pseudo-noise sequence having first and second interleaved pseudo-noise sequences to identify a third pseudo-noise sequence and
a correlator configured to correlate the third pseudo-noise sequence with a delayed phase conjugate version of itself to provide a measure of a frequency of a transmitted signal.

5. The receiver of claim 4 further including a downconverter configured to downconvert a received signal to provide a complex output signal.

6. The receiver of claim 5 further including a low pass filter coupled to the output of the downconverter to provide a filtered complex signal.

7. The receiver of claim 6 further including a complex multiplier to perform a complex multiplication of the filtered complex signal with a delayed version of the filtered complex signal to provide a product.

8. The receiver of claim 7 wherein the delayed version of the filtered signal is delayed by a chip period.

9. The receiver of claim 7 wherein the correlator is configured to correlate the product to provide the measure of frequency.

10. The receiver of claim 9 further including a peak detector.

11. A spread spectrum communication system comprising:
a transmitter having:
an encoder configured to interleave a first pseudo-noise sequence with a second pseudo-noise sequence to provide a third pseudo-noise sequence, the first and second sequences being chosen so that an exclusive-or (XOR) of the two sequences and an XOR of the two sequences with an offset of one chip period between them produce the third pseudo-noise sequence, the third pseudo-noise sequence being a known good PN sequence, and
RF transmitter circuitry configured to transmit the third pseudo-noise sequence; and
a receiver configured to receive the third pseudo-noise sequence, the receive having a correlator to correlate the third pseudo-noise sequence with a delayed phase conjugate version of itself to provide a measure of a frequency a transmitted signal.

12. The spread spectrum communication system of claim 11 wherein the receive includes a downconverter to downconvert a received signal to provide a complex output signal.

13. The spread spectrum communication system of claim 12 further including a low pass filter coupled to the output of the downconverter to provide a filtered complex signal.

14. The spread spectrum communication system of claim 13 further including a complex multiplier to perform a complex multiplication of the filtered complex signal with a delayed version of the filtered complex signal to provide a product.

15. The spread spectrum communication system of claim 14 wherein the correlator is configured to correlate the product to provide the measure of frequency.

16. The spread spectrum communication system of claim 15 further including a peak detector.

17. A method for spread spectrum communication comprising:
interleaving a first pseudo-noise sequence with a second pseudo-noise sequence to provide a third pseudo-noise sequence, the first and second sequences being chosen so that the exclusive-or (XOR) of the two sequences and the XOR of the two sequences with an offset of one chip period between them produce the third pseudo-noise sequence, the third pseudo-noise sequence being a known good PN sequence;
transmitting the third pseudo-noise sequence;
receiving the third pseudo-noise sequence; and
correlating the third pseudo-noise sequence with a delayed phase conjugate version of itself to provide a measure of a frequency a transmitted signal.

* * * * *

UNITED STATES PATENT AND TRADEMARK OFFICE
CERTIFICATE OF CORRECTION

| | |
|---|---|
| PATENT NO. | : 8,059,695 B2 |
| APPLICATION NO. | : 11/891948 |
| DATED | : November 15, 2011 |
| INVENTOR(S) | : David G. Manzi |

Page 1 of 1

It is certified that error appears in the above-identified patent and that said Letters Patent is hereby corrected as shown below:

IN THE SPECIFICATIONS:

In column 3, line 39, delete "is" and insert -- is a --, therefor.

In column 5, line 5, delete "$c_2...C_n$" and insert -- $c_2,...c_n$ --, therefor.

In column 5, line 39, delete "is" and insert -- is a --, therefor.

In column 7, line 29, delete "$(Q_{n2})$" and insert -- $(Q_{in2})$ --, therefor.

In column 7, line 65, delete "art" and insert -- art. --, therefor.

In column 8, line 36, delete "ration" and insert -- ratio --, therefor.

IN THE CLAIMS:

In column 10, line 4, in Claim 11, delete "receive" and insert -- receiver --, therefor.

In column 10, line 7, in Claim 11, delete "a" and insert -- of a --, therefor.

In column 10, line 9, in Claim 12, delete "receive" and insert -- receiver --, therefor.

In column 10, line 38, in Claim 17, delete "a" and insert -- of a --, therefor.

Signed and Sealed this
Thirty-first Day of January, 2012

David J. Kappos
*Director of the United States Patent and Trademark Office*